United States Patent [19]
Lamb

[11] Patent Number: 5,903,075
[45] Date of Patent: May 11, 1999

[54] PERMANENT MAGNET COUPLER WITH SOFT START ADJUSTMENT SYSTEM

[75] Inventor: Karl J. Lamb, Port Angeles, Wash.

[73] Assignee: Magna Force, Inc., Port Angeles, Wash.

[21] Appl. No.: 09/095,853

[22] Filed: Jun. 10, 1998

[51] Int. Cl.⁶ .................................................. H02K 7/10
[52] U.S. Cl. ........................................ 310/75 D; 310/105
[58] Field of Search ................................ 310/75 D, 105, 310/104, 92, 78

[56] References Cited

U.S. PATENT DOCUMENTS

| | | | |
|---|---|---|---|
| 5,477,093 | 12/1995 | Lamb | 310/75 D |
| 5,477,094 | 12/1995 | Lamb | 310/75 D |
| 5,650,679 | 7/1997 | Boggs, III et al. | 310/105 |
| 5,668,424 | 9/1997 | Lamb | 310/103 |
| 5,834,872 | 11/1998 | Lamb | 310/103 |

*Primary Examiner*—Nestor Ramirez
*Assistant Examiner*—Joseph Waks
*Attorney, Agent, or Firm*—Seed and Berry LLP

[57] ABSTRACT

The soft start of a permanent magnet coupler of the type in which magnetic flux from permanent magnets on a rotary magnet rotor bridges an air gap between the magnets and an electroconductive element on a rotary conductor rotor to magnetically couple said rotors together responsive to relative rotary motion between said rotors, is adjusted by changing the amount of flux which bridges the air gap. This is accomplished by attracting some of the flux to magnetic material selectively positioned on said magnet rotor adjacent one or more of said magnets.

21 Claims, 4 Drawing Sheets

PERMANENT MAGNET COUPLER WITH SOFT START ADJUSTMENT SYSTEM

TECHNICAL FIELD

The present invention relates to magnetic couplers having cooperating permanent magnet and conductor rotors separated by air gaps.

BACKGROUND OF THE INVENTION

Permanent magnet couplers of the general type disclosed in U.S. Pat. No. 5,477,094 have a magnet rotor and conductor rotor interacting to transmit power between input and output shafts. The magnet rotor has a plurality of circumferentially spaced permanent magnets having their opposite poles separated by air gaps from electro-conductive conductor elements provided by the conductor rotor on opposite axial sides of the magnet rotor. For many applications it is preferred that there be a "soft start" at start up, meaning that initially during start up there is a noticeable rotational slip between the rotors which gradually reduces to a minimum in a few seconds as the output shaft builds up speed from zero to a maximum. Less starting torque is required to drive a given load if the coupler is matched to the load such that there is a soft start experienced during start up. Also, there is less shock to the power transfer system when soft start is provided.

It is preferred that the soft start of a coupler be adjustable and that this be readily accomplished in the field after installation of the coupler. This permits a given magnetic coupler to be suitable for maximum performance in a variety of load applications without a need to change the number of magnets in the magnet rotor or change the air gaps. It also makes it possible to field adjust soft start of a coupler if the load at the installation is changed.

One approach to achieving soft start permanent magnet couplers is to vary the air gaps between the magnets on the magnet rotor and the conductor elements on the conductor rotor in a manner that can be easily accomplished at the use site without disconnecting the coupler, moving the prime mover or load, or loosening or adjusting hubs. However, this has required that the magnet rotor have two coaxial rotor components that are slide-mounted relative to the hub of the magnet rotor such that they can be moved axially relative to one another toward and away from the axially-spaced conductor elements on the conductor rotor so as to vary the air gaps equally between the conductor elements and magnets, and thereby vary the soft start.

SUMMARY OF THE INVENTION

The present invention aims to provide a soft start adjustment apparatus and method that is relatively simple to utilize in the field after installation of the coupling and does not involve air gap adjustment. The method involves varying the magnetic flux which bridges the air gaps between the magnets and the conductor elements. This is accomplished by selectively shorting out some of the flux by applying one or more flux shorting elements of magnetic material to the conductor rotor to extend, for example, between adjacent magnets. These shorting elements can take the form of U-shaped mild steel clips fitting over the rim of the magnet rotor and firmly fixed in position. Each clip shorts out part of the magnetic flux emanating from the adjacent magnets which otherwise would bridge the air gaps.

DETAILED DESCRIPTION OF THE INVENTION

Figure 1:
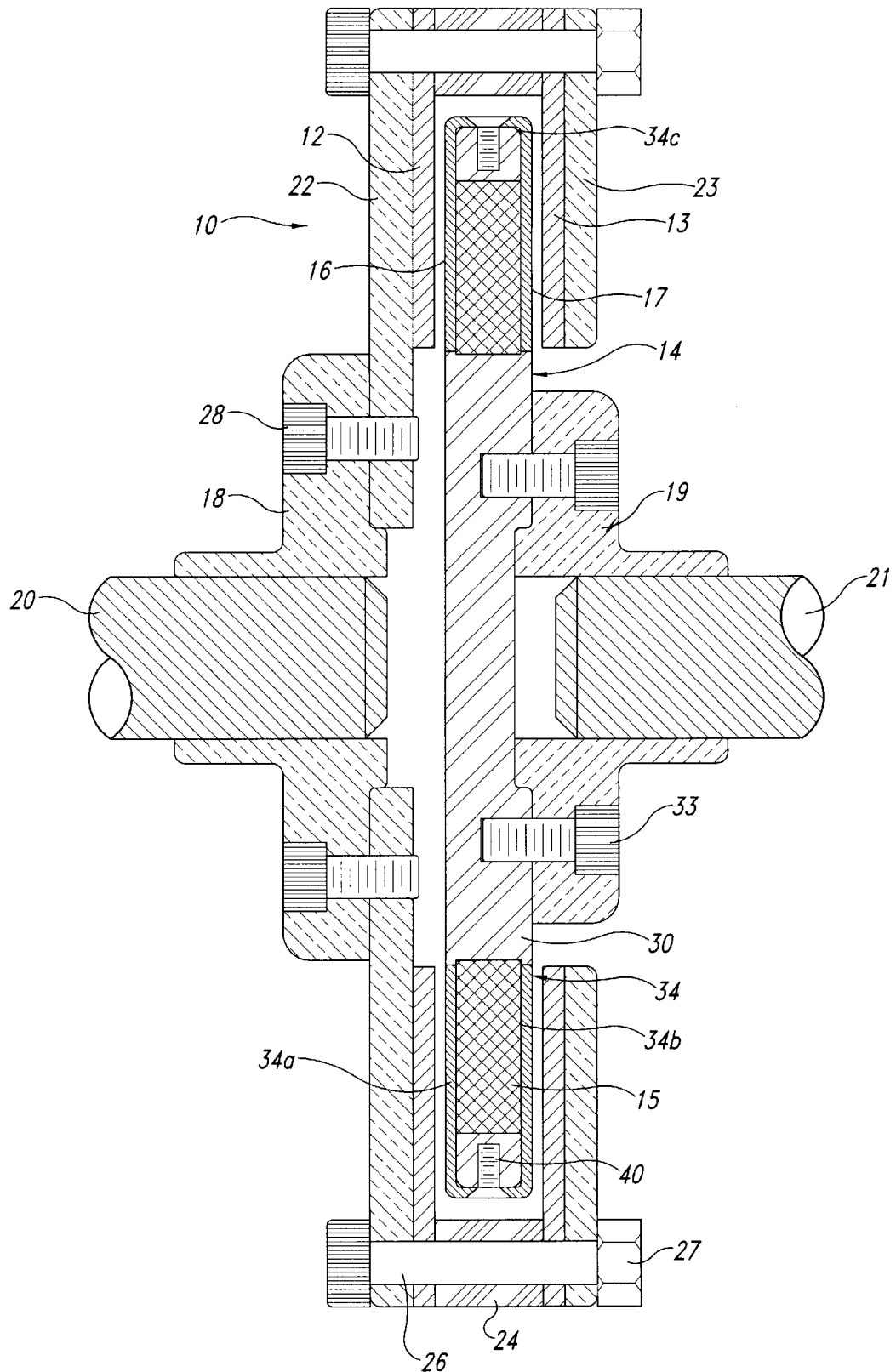
FIG. 1 is a longitudinal sectional view through a coupler containing the invention.

Referring to the drawings there is illustrated a coupling of the type disclosed in U.S. Pat. No. 5,477,094, and namely one in which a conductor rotor 10 providing an axially spaced pair of circular electroconductive elements 12–13, and a magnet rotor 14 providing a plurality of permanent magnets 15 each having its opposite poles spaced by air gaps 16–17 from the electroconductive elements, are mounted by hubs 18–19 on input and output shafts 20–21. The electroconductive elements are preferably copper and are fixed to backing member 22–23 of a suitable magnetic material such as mild steel which are held in spaced relation by tubular spacers 24 extending between the electroconductive elements and by bolts 26 passing through the backing members 22–23, the electroconductive elements and the spacers 24 to nuts 27. The backing member 22 is mounted by bolts 28 to the hub 18. As an alternative arrangement, the members 22–23 may be non-magnetic and backing rings of magnetic material may be mounted between the electroconductive elements 12–13 and the members 22–23.

The magnet rotor 14 comprises a disc 30 of non-magnetic material having a plurality of generally rectangular openings 32 extending axially therethrough and radially oriented. These openings 32 are arranged in a circle and are equally spaced apart. The magnets 15 are mounted in the openings 32 such that adjacent magnets have their poles reversed. Bolts 33 connect the hub 19 to the disc 30.

When the input shaft 20 is rotated the magnetic flux emanating from the magnets 15 bridges the air gaps 16–17 and eddy currents are responsively induced in the rotating electroconductive elements 12–13, thereby creating a ring of poles with each pole having a polarity the same as the polarity of the adjacent pole of the related magnet. As a result the magnet rotor 14 and related output shaft 21 are rotated together with the input shaft 20 and conductor rotor 10, but with some rotational slip of the output shaft relative to the input shaft. This slip is normally a maximum at start-up when the output shaft is loaded.

In accordance with the present invention the effective magnetic flux output (strength) of the magnets bridging the air gaps 16–17 is adjusted so that the slip is radially reduced over a start-up period of several seconds as the load is taken. This enables less horsepower for start-up to be necessary for a given load. Adjustment of the effective flux output is accomplished by shorting (shunting) part of the available magnetic flux so that it will not bridge the air gaps 16–17. This is done by providing one or more removable flux shorting members 34 of magnetic material on the magnet rotor 14 between magnets.

Figure 2:
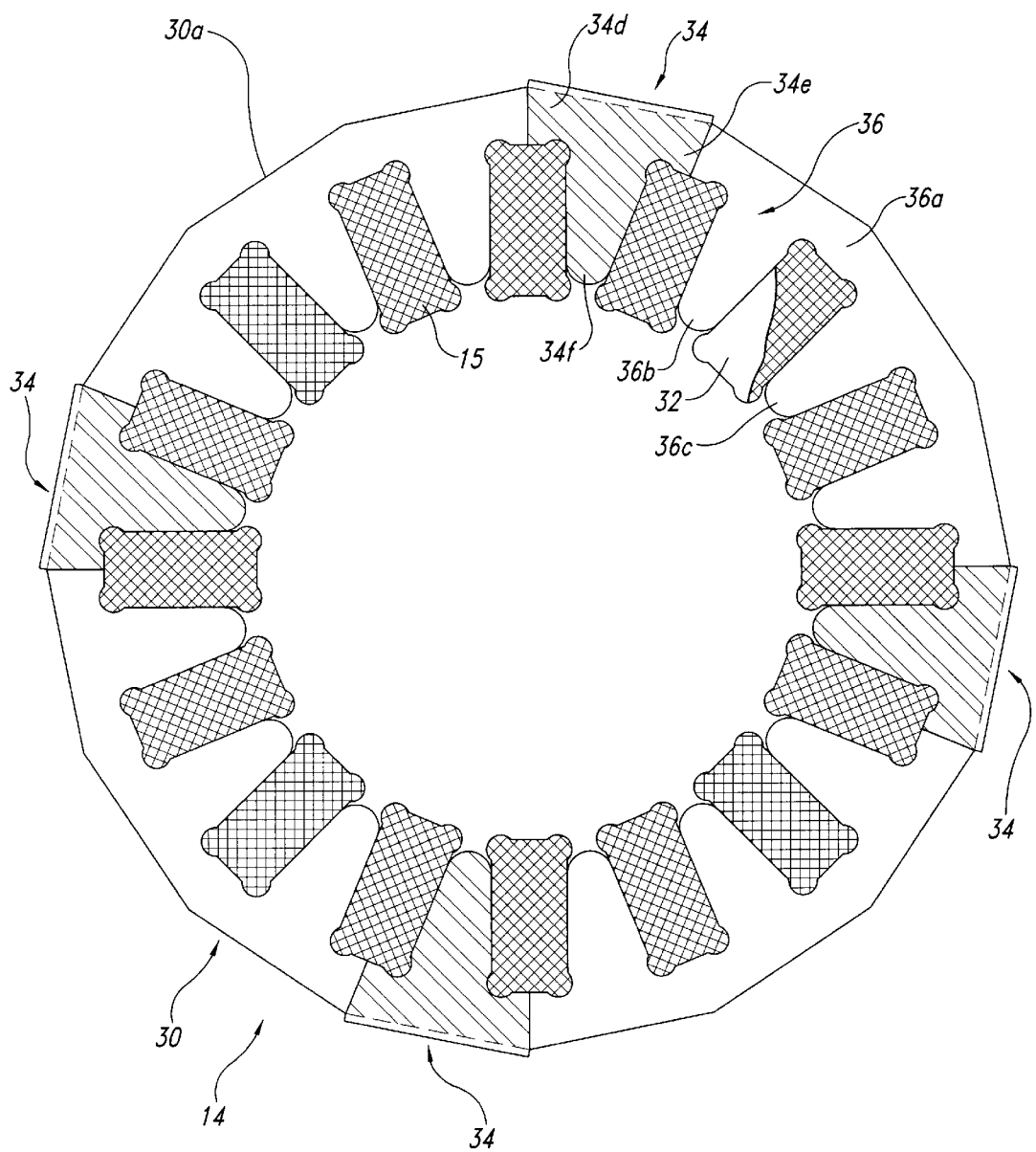
FIG. 2 is an end view of the magnet rotor, as seen from the left side in FIG. 1, with one of the magnets partly broken away and containing two pairs of flux shorting clips.
Figure 3:
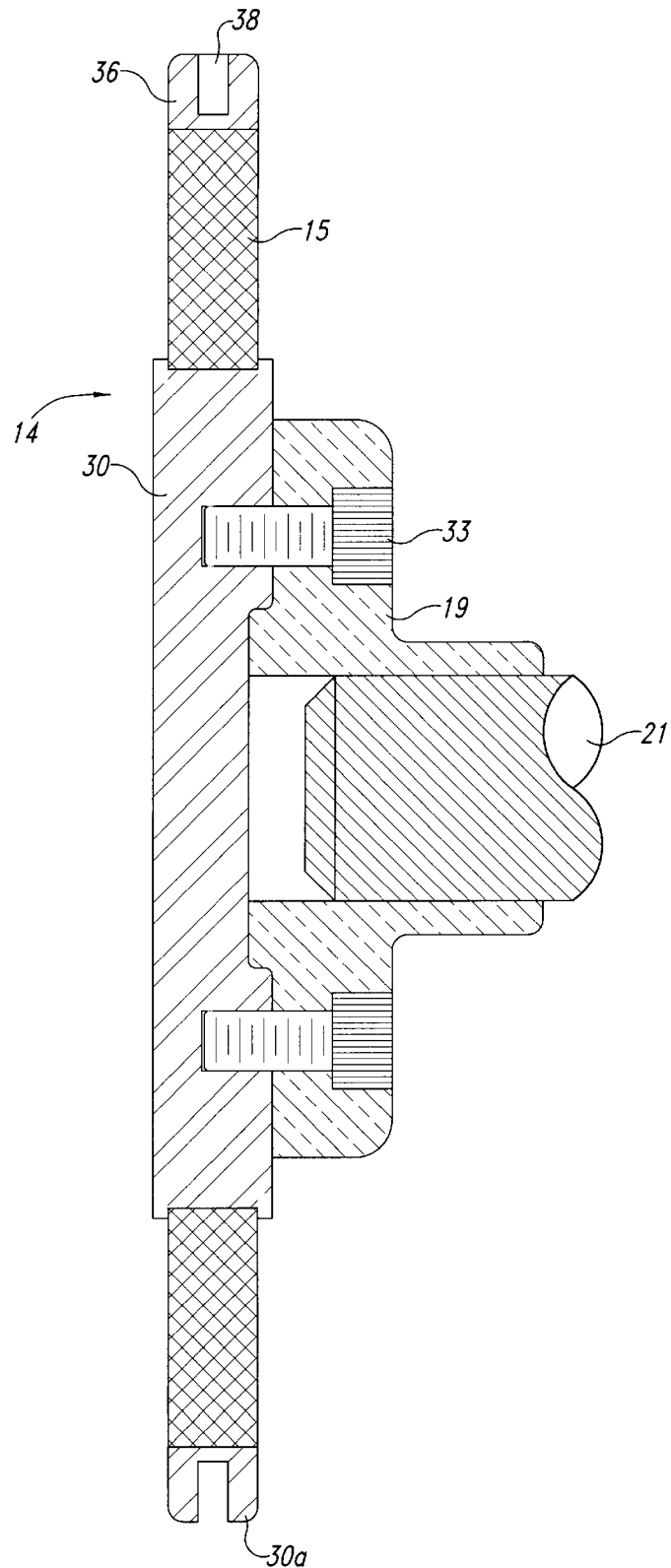
FIG. 3 is a cross-sectional view of the magnet rotor taken as indicated by line 3—3 in FIG. 2.
Figure 4:
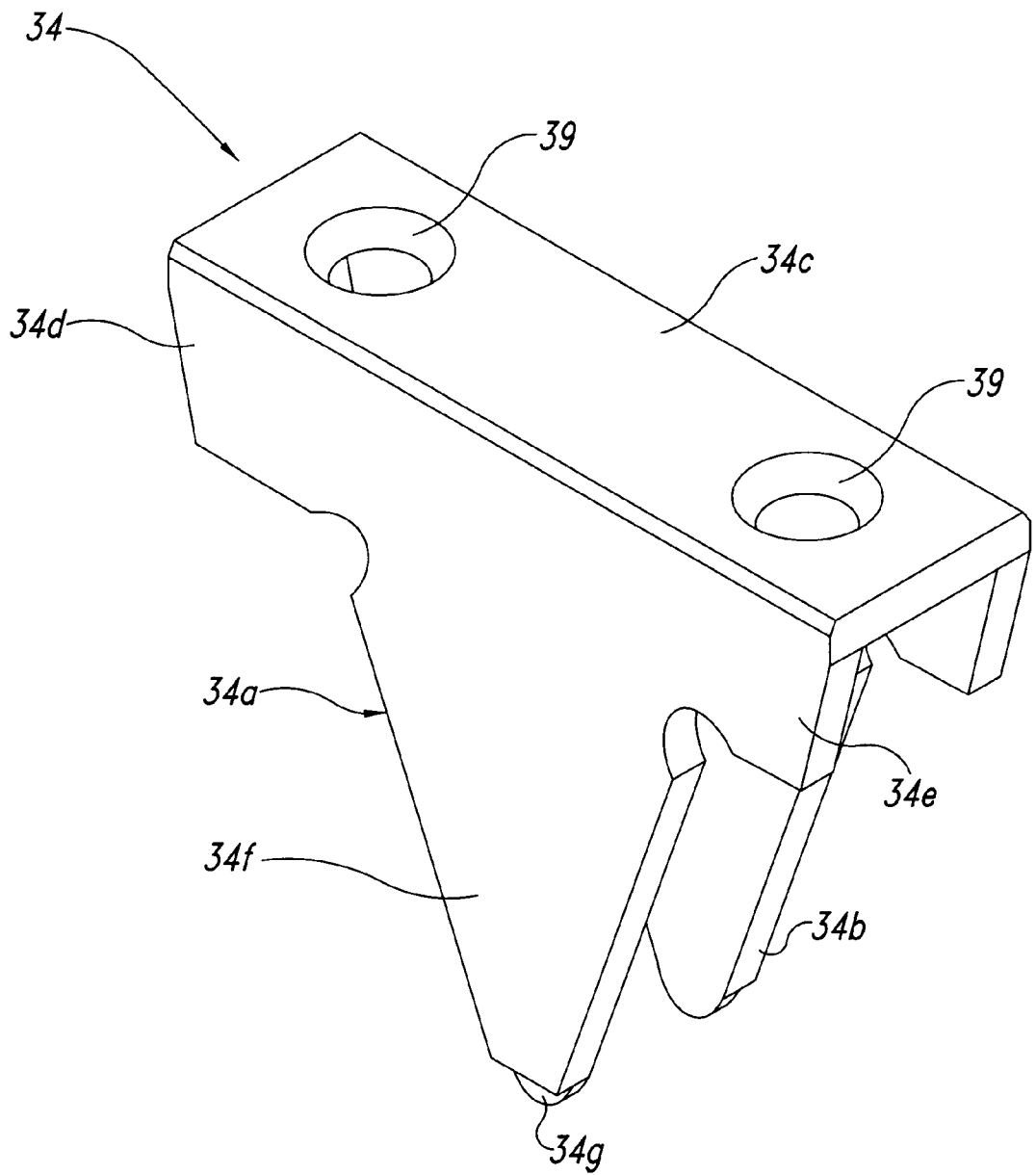
FIG. 4 is a perspective view of one of the flux shorting clips.

Each flux shorting member 34 may comprise a generally U-shaped clip shaped to fit over the rim of the disc 30 of the magnet rotor 14 and presenting a pair of clip flanges 34a–34b extending from a central web 34c between two of the magnets as shown in FIG. 1. These clip flanges fit into a pair of recesses 36 formed in the end faces of the disc 30 starting at the periphery. This periphery is preferably formed with equal flat faces 30a each interrupted by a pair of radially extending threaded holes spaced apart circumferentially of the disc 30, 38. Each recess 36 has an outer circumferential portion 36a from which a plurality of tapered extensions 36b with rounded noses 36c continue radially inward between the openings 32 for the magnets. As shown in FIG. 2 and 4, each of the clip flanges is generally T-shaped providing each flange with a pair of arms 34d–34e and a central leg 34f. The clip web 34c has a pair of tapered holes 39 arranged to register with a selected pair of the radial holes 38 in the disc 30 so that the respective clip can be held in place by a screws 40 each with a beveled head. The ends of the noses 36c of the tapered recess extensions 36b may have an undercut complemented by a recessed end portion 34g on the clip legs 34f so that the clips interfit with the disc 30 in a manner preventing spreading of the clip legs apart.

If, after the coupler has been installed at a job site, it is determined that a softer start is desired, a pair for example, of the flux shorting clips 34 are installed at diametrically opposite locations on the magnet rotor by applying them to the magnet rotor through one of the gaps between the spacers 24 in the conductor rotor. The installed clips preferably engage the adjoining magnets and attract magnetic flux therefrom. To that extent the clips weaken the flux bridging the air gaps 16–17. If this is found to provide an insufficient reduction in effective flux, a second pair of the clips 34 is installed at diametrically opposite locations and preferably midway between the first installed pair for balance as indicated in FIG. 2. If an odd number of flux shorting clips is to be used a non-magnetic clip of the same weight can be used to even out the number of clips to weight balance the magnet rotor. Adding of shorting clips is continued until the desired soft start is achieved.

It is important to note that the installation or removal of the shorting clips can be achieved when the coupler is in a fully assembled condition, thus making it possible to do so when the coupler is ready for start-up. The shorting clips do not require special skills for installation, and the desired soft start for a given load condition can readily be achieved by the described simple trial and error procedure in practicing the method of the present invention.

The described flux shorting apparatus for performing the method of the present invention is not intended to imply that the method is limited to use of this apparatus to vary the magnetic flux bridging the air gaps. For example, flux shorting elements may be slide mounted on or in the magnet rotor to be adjusted radially between inactive positions radially inset from the magnets to active positions adjoining some of the magnets.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A magnetic coupling with adjustable startup comprising:

a rotary conductor rotor having an electroconductive element backed by a member of magnetic material;

a rotary magnet rotor having a plurality of permanent magnets spaced by an air gap from said element such that a magnetic flux emanating form each of said magnets normallybridges said gap so as to induce eddy currents in said element responsive to a relative motion between said rotors, thereby magnetically coupling said rotors together;

and flux shorting means for selectively shorting a part of said flux to thereby increase a slip between said rotors and decrease a torque output at startup, said flux shorting means including members of magnetic material.

2. A magnetic coupling according to claim 1 in which said magnet rotor has recessed areas between some of said magnets, and said flux shorting means includes flux shorting member of magnetic material adapted to occupy said recesses.

3. A magnetic coupling according to claim 2 in which said recesses extend from a rim of said magnet rotor and said flux shorting members are detachably connected to said magnet rotor at said rim.

4. A magnetic coupling with adjustable startup comprising:

a rotary conductor rotor having an electroconductive element backed by a member of magnetic material;

a rotary magnetic rotor having a plurality of permanent magnets spaced by an air gap from said element such that a magnetic flux emanating from each magnet normally bridges said gap so as to induce eddy currents in said element responsive to relative motion between said rotors, thereby magnetically coupling said rotors together;

and a flux shorting unit of magnetic material detachably mounted on said magnet rotor in a flux shorting position reducing the magnetic flux otherwise bridging said gap from one or more of said magnets, thereby increasing a slip between said rotors and decreasing a torque output at the beginning of startup.

5. A magnetic coupling according to claim 4 in which said flux shorting unit extends two of said magnets from a rim of said magnet rotor and engages said two magnets.

6. A magnetic coupling according to claim 4 in which said flux shorting unit is seated in a recess in said magnet rotor.

7. A magnetic coupling according to claim 6 in which said recess extends the complete distance between two of said magnets.

8. A magnetic coupling according to claim 6 in which said recess extends between two of said magnets from a periphery of said magnet rotor.

9. A magnetic coupling with adjustable startup comprising:

a rotary conductor rotor having two axially spaced electroconductive elements each backed by a respective member of magnetic material;

a rotary magnet rotor between said elements having a plurality of permanent magnets spaced by air gaps from said elements such that a magnetic flux emanating from each of said magnets normally bridges said gaps so as to induce eddy currents in said elements responsive to relative motion between said rotors, thereby magnetically coupling said rotors together;

said magnet rotor having a rim which has a peripheral face to which there is an access when the coupling is in an assembled condition;

and detachable U-shaped flux shorting clips of magnetic material fitting over said rim so that each of said clips extends radially between adjoining of said magnets in flux shorting relation thereto.

10. A magnetic coupling according to claim 9 in which said magnet rotor has recesses extending between two adjacent of said magnets from said rim, said clips being seated in said recesses.

11. A magnetic coupling according to claim 10 in which screws connect said clips to said rim.

12. A magnetic coupling according to claim 9 in which each of said clips extends from said rim between two adjacent of said magnets, and also extends from said rim part way over the sides of such two adjacent magnet which are closet to said rim.

13. A method of adjusting a startup of a magnetic coupling of the type in which a magnetic flux from permanent magnets on a rotary magnet rotor bridges an air gap between the magnets and an electroconductive element on a rotary conductor rotor to magnetically couple said rotors together responsive to a relative rotary motion between said rotors, said method comprising:

adjusting an amount of said flux which bridges said air gap by attracting some of t he flux to magnetic material selectively positioned on said magnet rotor adjacent one or more of said magnets.

14. A method according to claim 13 in which said magnetic material is selectively positioned by mounting it on a rim of the magnet rotor in a location where the magnetic material extends between two adjacent of said magnets.

15. A method according to claim 13 in which said magnetic material is in a form of one or more ferrous elements adapted to be detachably mounted on the magnet rotor to occupy positions between adjoining of said magnets and exposed to said air gap.

16. A method according to claim 15 in which said ferrous elements are each in the form of a U-shaped clip fitting over a rim of the magnet rotor.

17. A method of adjusting a startup of a magnetic coupling of a type in which a magnetic flux from permanent magnets on a rotary magnet rotor bridges an air gap between the magnets and an electroconductive elements on a rotary conductor rotor to magnetically couple said rotors together responsive to a relative rotary motion between said rotors, said method comprising:

adjusting an initial startup torque by selectively shorting part of the magnetic flux so that does not bridge the air gap, said shorting involving moving ferrous elements to locations between and engaging some of the magnets.

18. A method according to claim 17 in which said ferrous elements are in a form of U-shaped clips straddling said magnet rotor.

19. A method of adjusting the startup of magnetic coupling of a type in which a magnetic flux form permanent magnets extending through a rotary magnet rotor bridges respective fixed air gaps between ends of said magnets and two spaced apart electroconductive elements on rotary conductor rotor which have backing members of magnetic material, to thereby magnetically couple said rotors together responsive to a relative rotary motion between said rotors, said method comprising:

adjusting an amount of said flux which bridges said air gaps by attracting some of the flux to a magnetic material selectively positioned on said magnet rotor adjacent the ends of one more of said magnets.

20. A method according to claim 19 in which said magnetic material on said magnet rotor is provided by generally U-shaped clips straddling said magnet rotor.

21. A method of adjusting the startup of a magnetic coupling of a type in which a magnetic flux from permanent magnets extending longitudinally through a rotary magnet rotor, bridges fixed air gaps between ends of the magnets and two axially spaced electroconductive elements on a rotary conductor rotor to magnetically couple said rotors together responsive to a relative rotary motion between said rotors, said method comprising:

adjusting an amount of said flux which bridges one of said air gaps by attracting some of the flux to detachable members of magnetic material selectively positioned on said magnet rotor adjacent said one air gap and adjoining one or more of said magnets.

\* \* \* \* \*